(No Model.) 4 Sheets—Sheet 1.
T. E. ARMITSTEAD.
BLIND.

No. 425,723. Patented Apr. 15, 1890.

WITNESSES:
INVENTOR:
T. E. Armitstead
BY Munn & Co
ATTORNEYS.

(No Model.) 4 Sheets—Sheet 2.
T. E. ARMITSTEAD.
BLIND.
No. 425,723. Patented Apr. 15, 1890.
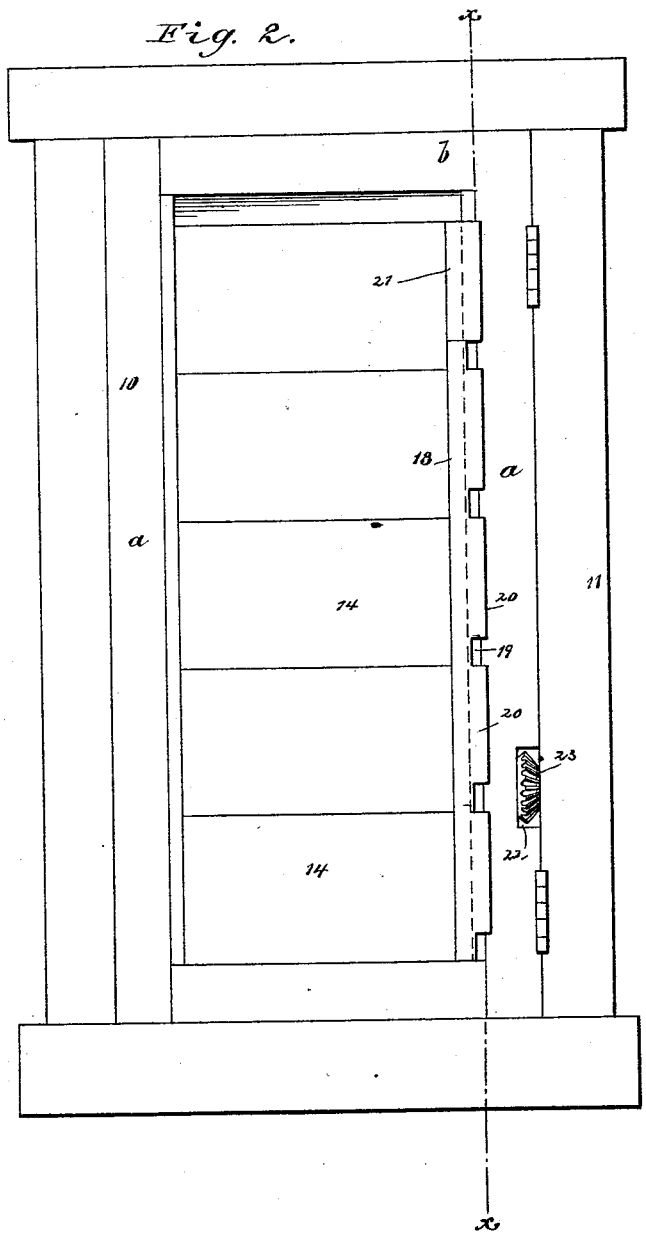
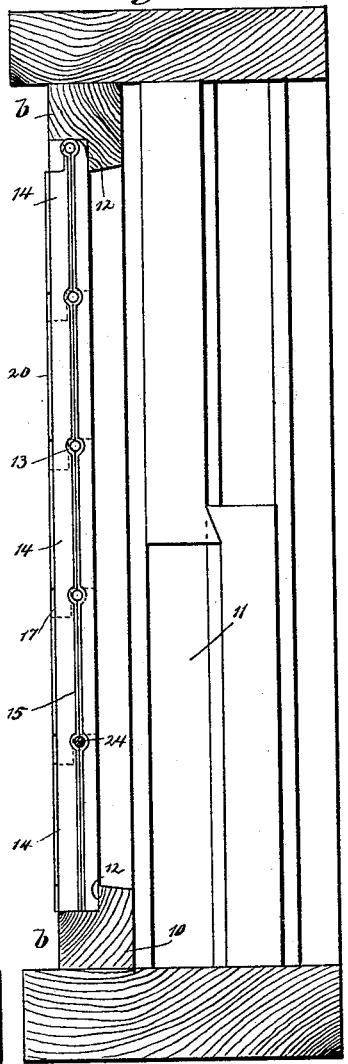
WITNESSES:
INVENTOR:
T. E. Armitstead
BY Munn & Co.
ATTORNEYS.

(No Model.)

T. E. ARMITSTEAD.
BLIND.

No. 425,723. Patented Apr. 15, 1890.

WITNESSES:

INVENTOR:
T. E. Armitstead
BY Munn & Co
ATTORNEYS.

(No Model.) 4 Sheets—Sheet 4.

T. E. ARMITSTEAD.
BLIND.

No. 425,723. Patented Apr. 15, 1890.

WITNESSES:

INVENTOR:
T. E. Armitstead
BY Munn & Co.
ATTORNEYS.

UNITED STATES PATENT OFFICE.

THOMAS E. ARMITSTEAD, OF MAZOMANIE, WISCONSIN.

BLIND.

SPECIFICATION forming part of Letters Patent No. 425,723, dated April 15, 1890.

Application filed February 6, 1889. Renewed March 11, 1890. Serial No. 343,551. (No model.)

*To all whom it may concern:*

Be it known that I, THOMAS E. ARMITSTEAD, of Mazomanie, in the county of Dane and State of Wisconsin, have invented a new and useful Improvement in Slatted Blinds and Devices for Operating the Same, of which the following is a full, clear, and exact description.

The invention will be first described, and then specifically pointed out in the claims.

Reference is to be had to the accompanying drawings, forming a part of this specification, in which similar letters and figures of reference indicate corresponding parts in all the views.

Figure 1:
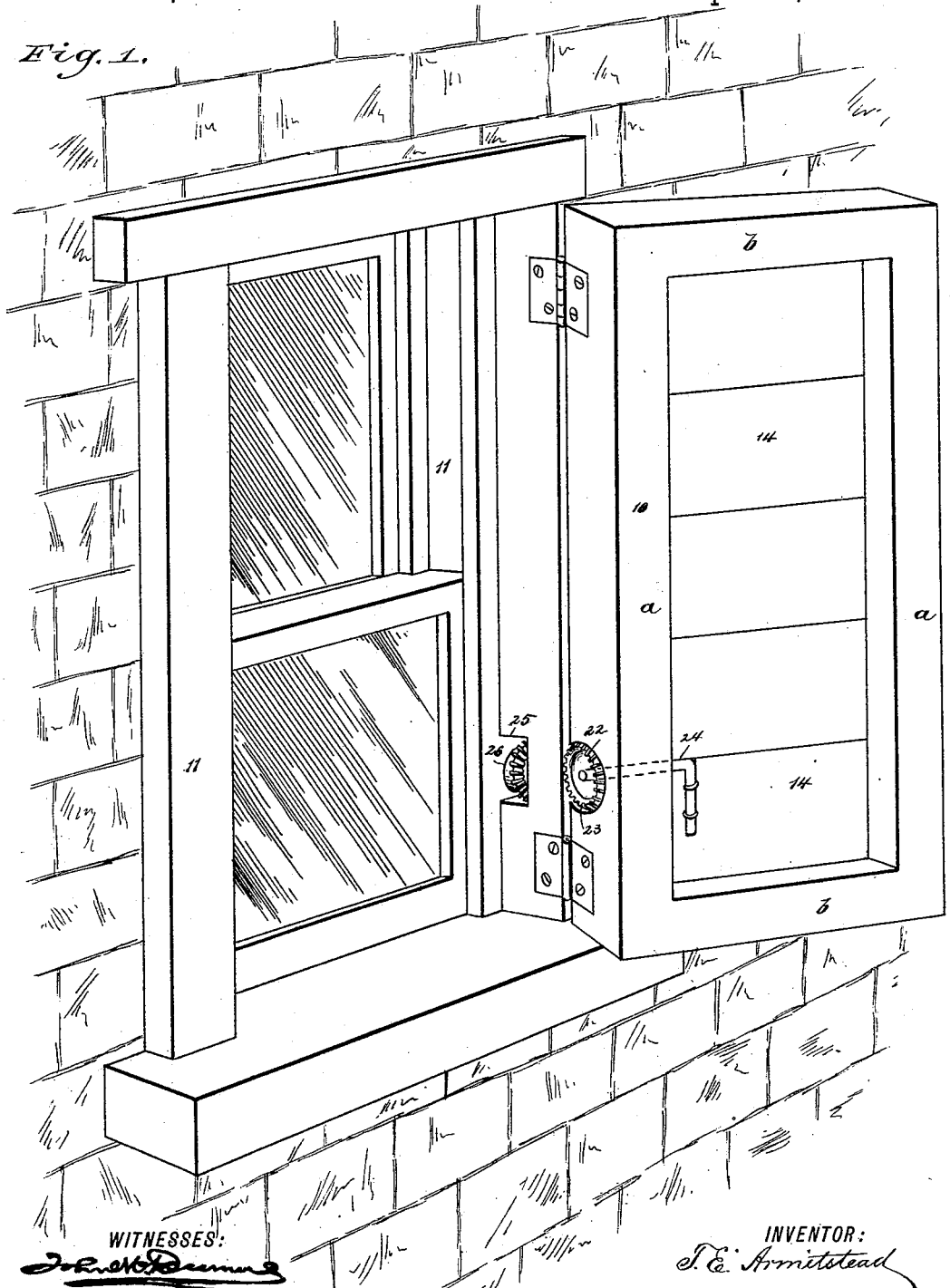
Figure 4:
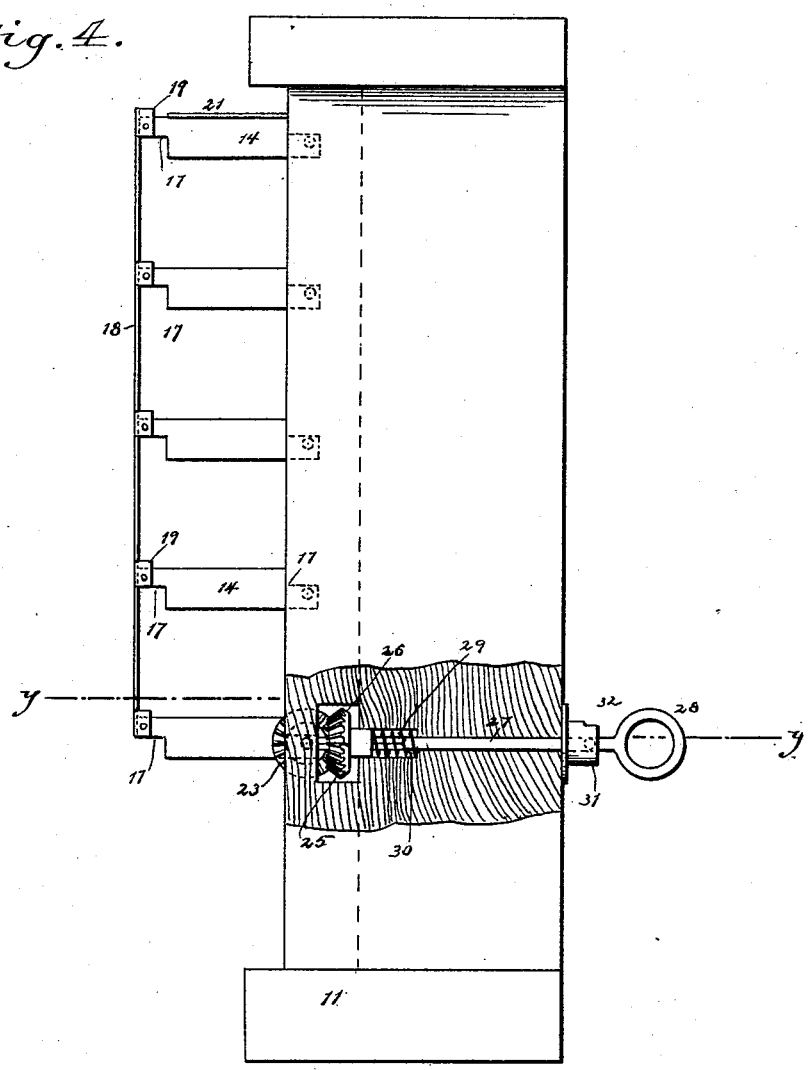
Figure 8:
Figure 9:
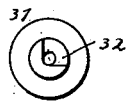
Figure 5:
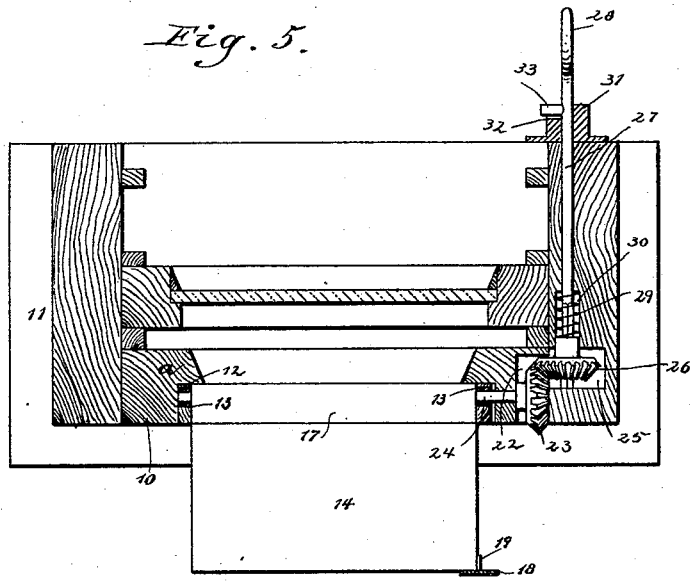
Figure 6:
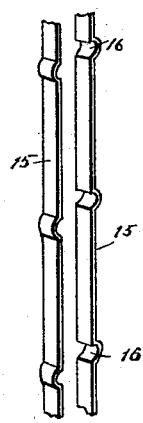
Figure 7:
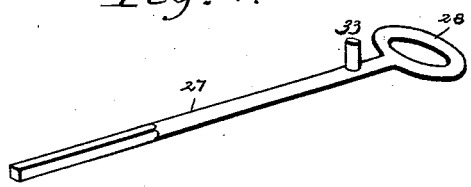

Figure 1 is a perspective view of a single blind attached to a window, the said blind being represented as open. Fig. 2 is a front elevation of the blind closed, the slats being closed also. Fig. 3 is a longitudinal section on line $x\,x$ of Fig. 2. Fig. 4 is a side elevation of the window-frame, partly in section, illustrating the slats of the attached blinds in open position. Fig. 5 is a horizontal section on line $y\,y$ of Fig. 4. Fig. 6 is a perspective view of the slat-bearing detached. Fig. 7 is a perspective view of the operating key-shaft. Fig. 8 is a plan view of the key-shaft and its guide-button, and Fig. 9 is a plan view of the button.

In carrying out the invention the blind-frame 10 is hinged to the window-frame 11 in any approved manner, and the said blind-frame is provided upon the inner edge of the stiles $a$ and rails $b$ at the front with a rabbet 12, as best shown in Figs. 3 and 5, and in the vertical wall of the stile-rabbet a series of spaced metallic bearings 13 are inserted and rigidly secured. The bearings 13, which are adapted to receive the trunnions of the blind-slats 14, may consist of a tubular casting or forging introduced into a suitable aperture in the stile; but the bearings are preferably made as illustrated in Fig. 6, in which are shown two strips 15, of suitable material, stamped at intervals to provide a circular recess 16 in one face. The two strips are brought together so that the circular recesses in each register, and the said strips so placed are introduced into the rabbet of each stile and secured therein in any manner found most convenient and effectual.

The slats 14, employed in connection with the blind-frame, are provided with the ordinary trunnions, which trunnions, as heretofore stated, are journaled in the metallic bearings 13, and in the contiguous edges of each of the slats a rabbet 17 is produced. Thus, for instance, the rabbet in the lower edge of each slat is produced upon the inner face thereof, and the rabbet in the upper edge is produced upon the outer face of the slat. By this means when the slats are closed the lower rabbet of the upper slat is brought in contact with the upper rabbeted surface of the next slat below. It is evident from this construction that when the blinds are closed their outer faces will be in the same vertical plane; and it will be further observed that by reason of the rabbets in the stiles and rails, against which the inner outer edges of the slats contact, the outer faces of the slats will also be in the same vertical and horizontal plane as is the outer face of the blind-frame.

It is not necessary in practice to rabbet the lower edge of the lower slat, as the thickness of the slats corresponds with the depth of the rabbets in the frame.

The series of slats 14, pivoted in the frame 10, are connected at one or both side edges by a vertical rod or bar 18, which bar is provided with ears 19 at intervals in its length and integral with the outer side, the said ears being made to stand at a right angle to the connecting-bar, and one of the said ears is pivotally secured to the outer edge of each slat 14 at the bottom of the same, as illustrated in Fig. 4. Between the ears 19 the connecting-bar is provided with an extension 20 in the same plane with the face of the bar, which extensions, when the slats are closed, are adapted to cover any space that may intervene between the outer edges of the slats and the contiguous face of the frame, and thus effectually exclude the light from the room. The upper slat 14 is provided with a rigidly-attached cover-plate 21, said cover-plate corresponding to the extension 20 of the connecting-bar. When the slats are opened or brought to a horizontal position, as illustrated in Fig. 4, the connecting-rod is carried outward to a perpendicular position parallel with the outer face of the frame, yet removed therefrom, and when the slats are closed, as shown in Fig. 2, the connecting-bar falling with the slats is brought in close contact with the same.

At a convenient point in the outer face of the inner frame-stile *a* a recess 22 is formed, adapted to receive a miter-gear 23, which miter-gear is rigidly secured to a rod 24, the said rod, which is preferably an angled rod, as illustrated in Fig. 1, being firmly set into the inner face of a convenient slat, forming one of the trunnions for said slat.

In the outer face of the window-frame 11, to which the blind-frame is hinged, an opening 25 is formed, in which a miter-gear 26 is held to turn, the said miter-gear projecting from the opening to such an extent as to engage with the miter-gear of the bind-frame when said blind is closed, as illustrated in Fig. 4. The miter-gear 26 in the window-frame is attached to the key-shaft 27, which shaft projects through the window-frame transversely into the room, terminating at the inner end in a suitable handle 28, which may be ornamental or plain, as desired. The key-shaft 27 is circular a greater portion of its length, but the outer end, upon which the miter-gear 26 is held, is polygonal, as best illustrated in Fig. 7. The gear having been placed upon the polygonal end of the key-shaft, the outer extremity is struck up or otherwise manipulated to prevent the gear from sliding off, and to the rear of the gear a spring 29 is coiled around the key-shaft, a recess 30 being produced in the window-frame for the reception of the said spring, as best shown in Figs. 4 and 5, and as the spring has a bearing at one end upon the inner wall of the recess 29 and at the other end against the miter-gear 26, the said gear is continually forced outward in the direction of the outer extremity of the key-shaft, so that it is at all times in position to contact with the similar gear in the blind-frame.

To control the rotation of the key-shaft 27 a button 31 is attached to the inner face of the window-frame, through which the inner end of the said shaft is made to pass, and the said button is provided with a quadrantal recess 32 in one side, through which recess a pin 33, integral with the inner projecting end of the key-shaft, is made to project. Thus when the pin 33 is brought in contact with one end wall of the button-recess 32 the slats will have been brought down to a closed position and the shaft can be rotated in that direction no farther. When the pin strikes the opposite end wall of the button-recess, the slats are opened to their fullest extent, as illustrated in Fig. 4. It is evident that by rotating the key-shaft 27 when the window-blind is closed the two gears 23 and 26, which mesh in that position, will be rotated also, and that a rotary motion will be imparted to the rod 24, secured to one of the slats 14; also, that the slats, being all connected, must necessarily follow the movement of the rod 24.

I desire it to be understood that when the slat-opening in the blind-frame is divided, so that two series of slats are employed, the devices for manipulating the slats are duplicated, and that, although I have illustrated my improvement as applied to a single blind only, the same is equally applicable to double blinds, in which event the manipulating mechanism is introduced into each side of the window-frame. If in practice it is found desirable, the metallic bearings may be omitted, and the trunnions of the slats may be journaled in the stiles of the blind-frame in the usual manner.

Having thus described my invention, what I claim as new, and desire to secure by Letters Patent, is—

1. The combination, with a blind-frame provided with a rabbet in the inner front edges of the stiles and rails, and metallic bearings formed of strips 15, secured in the outer wall of the stile-rabbets and having registering recesses 16, of a series of slats having their trunnions journaled in said recesses, substantially as shown and described.

2. The combination, with a blind-frame provided with a rabbet in the inner front edges of the stiles and rails, and a series of slats pivoted in said rabbets to close flush with the outer face of the frame, of a bar pivoted to the lower edges of the slats and projecting at one vertical edge beyond the ends of the slats at one side of the frame, substantially as shown and described.

3. The combination, with a blind-frame provided with a rabbet in the inner front edges of the stiles and rails, and a series of slats pivoted in said rabbet, having a rabbet in their upper and lower contacting surfaces, of a bar pivoted to the lower edges of the slats and projecting at one vertical edge beyond the ends of the slats at one side of the frame, substantially as shown and described.

THOS. E. ARMITSTEAD.

Witnesses:
JOHN R. MURRESH,
CHAS. BUTZ.